United States Patent [19]

Lupica

[11] 3,928,700
[45] Dec. 23, 1975

[54] METHOD OF PRODUCING THIN CELLULOSE NITRATE FILM

[75] Inventor: Sebastian B. Lupica, Oak Ridge, Tenn.

[73] Assignee: The United States of America as represented by the United States Energy Research and Development Administration, Washington, D.C.

[22] Filed: May 30, 1974

[21] Appl. No.: 474,554

[52] U.S. Cl. ............... 428/220; 106/195; 250/472; 250/473; 428/332; 428/337
[51] Int. Cl.² ..... B32B 7/02; C08L 1/18; G01T 1/02
[58] Field of Search ............ 161/165; 250/472, 473; 106/195; 428/220, 332, 337

[56] References Cited
UNITED STATES PATENTS

| | | | |
|---|---|---|---|
| 3,520,960 | 7/1970 | Douglas | 106/195 |
| 3,569,703 | 2/1971 | Alter | 250/472 |
| 3,604,931 | 9/1971 | Kastner | 250/472 |
| 3,770,962 | 11/1973 | Fleisher | 250/473 |

OTHER PUBLICATIONS

"Encyclopedia of Polymer Science and Technology," Vol. 3, pp. 307–325.

Primary Examiner—George F. Lesmes
Assistant Examiner—Ellis P. Robinson
Attorney, Agent, or Firm—Dean E. Carlson; David S. Zachry; Irving Barrack

[57] ABSTRACT

An improved method for forming a thin nitrocellulose film of reproducible thickness is described. The film is a cellulose nitrate film, 10 to 20 microns in thickness, cast from a solution of cellulose nitrate in tetrahydrofuran, said solution containing from 7 to 15 percent, by weight, of dioctyl phthalate, said cellulose nitrate having a nitrogen content of from 10 to 13 percent.

1 Claim, No Drawings

METHOD OF PRODUCING THIN CELLULOSE NITRATE FILM

BACKGROUND OF THE INVENTION

The invention described herein was made in the course of, or under, a contract with the U.S. Atomic Energy Commission.

The present invention relates to an improved process for the manufacture of polymer films useful in track registration of charged nuclear particles and more particularly to a process for producing cellulose nitrate films of uniform thickness and composition in a thickness range of 10–20 microns. In the context of this invention, a track registration film is an organic film in which the latent tracks of charged nuclear particles passing into or through the film may be subsequently determined by etching the films in a caustic solution to cause the plastic along the tracks to be preferentially removed.

Polymer films, such as polycarbonate and cellulose nitrate, are typically utilized for nuclear particle track registration measurements. These are used for the detection of charged particles, such as fission products and alpha particles, and are often utilized in personnel dosimeters. The generally accepted theory given to explain latent track formation in these polymers is based on a radiochemical damage mechanism. Etchable tracks are formed, according to this theory, by radiolytic scission of long polymer chains into shorter fragments and the production of reactive, low-molecular-weight radiolytic products which are more easily etchable than the undamaged surrounding bulk plastic.

In a normal utilization of these films for any dosimetric applications, they are first subjected to bombardment by the particular nuclear particles of interest. The films, as used, may be of the order of 10–30 microns thick and may be unsupported or supported by a suitable holder of nonetchable material. After exposure, the films (and holder, if present) are submerged in, for example, 5 M (28%) KOH at a temperature of 20°–60°C. for 1–4 hours. The optimum etching conditions are empirically determined for a particular film material, thickness, and type of bombarding particle. After drying, the detectable tracks are counted by any of several conventional methods.

One of the most convenient methods of track counting when the etched tracks penetrate the film is that described by W. J. Cross and L. Tommasino in "Radiation Effects," 5, 85 (1970). Briefly, this method involves placing the etched and dried film on a flat electrode. Clamping of the thin foils in retainer rings, or otherwise attaching the foils to plastic rings, simplifies their handling. The film is then covered with a piece of aluminized Mylar (polyethylene teriphthalate film) with the aluminized side facing the etched film and making contact with an outer, grounded electrode. When a positive voltage of several hundred volts, e.g., 500–600 V, is applied, sparks occur through the perforations in the etched film. The use of a high initial voltage may be used to complete the development of the holes by spark-punching incompletely etched tracks. Each spark is recorded in a scaler unit thereby permitting rapid, automatic counting of essentially all tracks in a large detector area. This method of counting is more sensitive than counting tracks in smaller areas of the film with an optical microscope or optical scanning devices and is generally less time consuming.

In order to obtain reliable counting results, each film to be analyzed by the spark counting method must be substantially uniform in thickness. A non-uniform film thickness tends to generate spurious sparks at thinner areas. Uniform polycarbonate films of the order of 10-micron thickness, which can be used to detect heavier charged particles, are readily available from commercial vendors. However, in applications requiring a polymer film of high sensitivity such as the detection of alpha particles and other lighter charged particles, cellulose nitrate films are desired and uniform films of such material are not readily available in the 10–15-micron thickness range. Attempts to make satisfactory uniform cellulose nitrate films in this range of thickness, using conventional technology such as described in a U.S. Navy report, USNRDL-TR-68-14, by E. V. Benton, have been generally unsuccessful.

SUMMARY OF THE INVENTION

It is therefore an object of the present invention to provide a process for the production of cellulose nitrate films of uniform and reproducible thickness in the range 10 to 20 microns.

Another object of the invention is to provide a process for the preparation of uniform cellulose nitrate films of high quality with regard to uniformity of etching of the base plastic and low background due to imperfections.

It is an object of the present invention to provide a cellulose nitrate film 10 to 30 microns in thickness, uniformly thick within ±0.5 micron, cast from a solution of cellulose nitrate in tetrahydrofuran, said solution containing 7 to 15 percent, by weight, of dioctyl phthalate, said cellulose nitrate having a nitrogen content of from 10 to 13 percent.

A further object of the invention is to provide a cellulose nitrate film which is strong and durable while being sensitive to and capable of registering high track densities created by alpha particles.

These and other objects are realized by utilizing film casting solutions consisting of solutions of nitrocellulose in a tetrahydrofuran (THF) solvent, mixing therewith a small amount of an organic plasticizer, and placing the resultant solution in a flat dish for casting of the film. A plasticizer is used to enhance the registration of tracks by decreasing the bulk rate of etch of the cellulose nitrate relative to the damaged material along the charged particle tracks. Dioctyl phthalate (DOP) is typically used for this purpose. Films with a DOP concentration of 7–15 percent based on the weight of the cellulose nitrate are suitable for registration of charged particle tracks and for obtaining the lowest number of imperfections that result in "background tracks" in the etched films. Such films can withstand the caustic etch needed to develop the latent tracks of charged nuclear particles for spark counting. Films containing below 7 percent demonstrated a short etch life (dissolved too rapidly), while those above about 15 percent had poor hardness and strength characteristics. With the dish partially covered, as with a glass plate, the film casting solution is subjected to an environment of dry air to evaporated THF. Thereafter the film is heated at about 55° for an hour to assure complete removal of THF and the film is then floated off the casting dish using water in a conventional manner. After air drying, the film is annealed at about 85°C. for several hours as is customary in the preparation of such polymer films. The film is then cut into sizes appropriate for dosimeter uses.

The following example is provided as a representative embodiment of a typical procedure for forming a satisfactory cellulose nitrate film for track registration dosimetry.

EXAMPLE

A film of 15-micron thickness was prepared by pipetting 9 cc of a solution of 30 g Hercules nitrocellulose RS 5-6 powder (Hercules Powder Co., Wilmington, Del.), which was wetted with alcohol, dissolved in 450 cc of tetrahydrofuran (solution assayed 0.0553 g cellulose nitrate per cc) into a 50-cc vial containing 20 cc THF. To this was added 0.5 cc of 10% dioctyl phthalate in THF (0.10 g DOP per cc) and the total volume was brought to 40 cc with additional THF. After complete mixing, the solution was poured into a leveled, optically flat-bottomed dish within a cover box. The casting dish was partly covered and the box was flushed with dry air to effect evaporation of the bulk of the solvent. The THF was permitted to evaporate slowly at room temperature for about 12 hours to form a film. The film was dried for one hour at 55°C. after which it was floated off the casting dish with distilled water and air dried. The dried film was then annealed at 85°C. overnight. If residual solvent is not removed by the annealing process, films are produced that will not etch properly, resulting in unreliable spark counting of charged particle tracks. Due to the fact that THF has a relatively low boiling point of 65°C. and is non-reactive with cellulose nitrate, complete removal is assured in the annealing process. Casting in a dry environment assures that moisture was not occluded in the films. Occlusion of moisture is evidenced by speckled and hazy films which are also unsuitable as track etch detectors.

The thickness of the resultant film was determined at the middle of each quadrant of the film using a Zeiss reflectance microscope. A Teflon (polytetrafluoroethylene) wafer, with the center appropriately removed for the microscope optics, was used to hold and prevent movement of the film by static charge or by convection currents during measurement. Measurements were reproducible to ±0.5 micron and indicated that the film was 15–16 microns in thickness.

Certain modifications in the film-producing steps result in changes in the product. For example, thicker films up to, for example, 20 microns may be produced by adding a greater quantity of the initial nitrocellulose constituent, thickness being substantially proportional to the quantity of nitrocellulose, assuming other proportions and the casting dish remaining unchanged. Films as thin as about 10 microns can be produced by reducing the nitrocellulose proportionally.

Alpha-exposed thin (10–20-micron-thick) films made according to this invention can be developed by etching in 4–6 M KOH solution at 40°C. for a time ranging from 100 to 135 minutes. Such films are still intact even after a three-hour etch, indicating their durability. Track density for these films as determined with a spark counter was linear with alpha particle fluence up to several thousand counts per square centimeter before reaching saturation.

What is claimed is:

1. A cellulose nitrate film 10 to 20 microns in thickness, uniformly thick within ±0.5 micron, said film formed by a method which comprises forming a solution of cellulose nitrate containing 10–13 percent by weight nitrogen in tetrahydrofuran, said solution containing 7–15 percent by weight dioctyl phthalate based on the weight of cellulose nitrate, evaporating said solution on a flat surface, drying the resultant film, removing said film from said surface, and then annealing said film to remove residual solvent.

* * * * *